(12) United States Patent
Takasaki et al.

(10) Patent No.: US 12,521,699 B2
(45) Date of Patent: Jan. 13, 2026

(54) EXHAUST PURIFICATION CATALYST

(71) Applicant: Cataler Corporation, Kakegawa (JP)

(72) Inventors: Kohei Takasaki, Kakegawa (JP);
Tatsuya Ohashi, Kakegawa (JP);
Keiichi Narita, Kakegawa (JP)

(73) Assignee: Cataler Corporation, Kakegawa (JP)

( * ) Notice: Subject to any disclaimer, the term of this patent is extended or adjusted under 35 U.S.C. 154(b) by 650 days.

(21) Appl. No.: 17/788,020

(22) PCT Filed: Dec. 2, 2020

(86) PCT No.: PCT/JP2020/044773
§ 371 (c)(1),
(2) Date: Jun. 22, 2022

(87) PCT Pub. No.: WO2021/131545
PCT Pub. Date: Jul. 1, 2021

(65) Prior Publication Data
US 2023/0032414 A1 Feb. 2, 2023

(30) Foreign Application Priority Data
Dec. 26, 2019 (JP) .................. 2019-236718

(51) Int. Cl.
*B01J 23/44* (2006.01)
*B01D 53/94* (2006.01)
(Continued)

(52) U.S. Cl.
CPC .............. *B01J 23/44* (2013.01); *B01D 53/94* (2013.01); *B01J 21/04* (2013.01); *B01J 23/10* (2013.01);
(Continued)

(58) Field of Classification Search
CPC .................. B01D 53/94; B01D 53/945; B01D 2255/1023; B01D 2255/65;
(Continued)

(56) References Cited

U.S. PATENT DOCUMENTS 8,877,636 B1 * 11/2014 Hunter ............... G01N 33/0037
438/665
10,835,866 B2 * 11/2020 Goffe ..................... B01J 37/035
(Continued)

FOREIGN PATENT DOCUMENTS

CN         1445015 A    10/2003
CN         1473073 A    2/2004
(Continued)

OTHER PUBLICATIONS

JP 2002-361089A (Year: 2024).*
(Continued)

*Primary Examiner* — Dapinder Singh
(74) *Attorney, Agent, or Firm* — Young Basile Hanlon & MacFarlane, P.C.

(57) ABSTRACT

The present invention provides an exhaust gas purification catalyst in which platinum group metal migration from a catalyst layer to a base material during high temperature duration is suppressed. The exhaust gas purification catalyst disclosed herein includes a base material, a catalyst layer, and an intermediate layer arranged between the base material and the catalyst layer. The base material contains SiC. The catalyst layer contains a platinum group metal as a catalyst component. The intermediate layer contains substantially no platinum group metal. A product of a thickness of the intermediate layer ($\mu m$) and a specific surface area ($m^2/g$) of the intermediate layer is 1100 or more.

3 Claims, 3 Drawing Sheets

(51) Int. Cl.
| | |
|---|---|
| *B01J 21/04* | (2006.01) |
| *B01J 23/10* | (2006.01) |
| *B01J 27/22* | (2006.01) |
| *B01J 27/224* | (2006.01) |
| *B01J 35/33* | (2024.01) |
| *B01J 35/56* | (2024.01) |
| *B01J 35/61* | (2024.01) |
| *F01N 3/20* | (2006.01) |
| *F01N 3/28* | (2006.01) |

(52) U.S. Cl.
CPC ............ *B01J 27/224* (2013.01); *B01J 35/33* (2024.01); *B01J 35/613* (2024.01); *F01N 3/2013* (2013.01); *F01N 3/2803* (2013.01); *B01D 2255/1023* (2013.01); *B01D 2255/9202* (2013.01); *B01D 2255/9207* (2013.01); *B01J 35/56* (2024.01); *F01N 2370/02* (2013.01)

(58) Field of Classification Search
CPC ...... B01D 2255/9022; B01D 2255/908; B01D 2255/9202; B01D 2255/9207; B01J 21/04; B01J 23/10; B01J 23/40; B01J 23/44; B01J 23/63; B01J 27/224; B01J 35/33; B01J 35/56; B01J 35/613; B01J 35/615; B01J 37/0244; B01J 37/0248; F01N 3/2013; F01N 3/2803; F01N 3/2828; F01N 3/0222; F01N 3/28; F01N 3/10; F01N 2330/02; F01N 2330/06; F01N 2330/30; F01N 2370/02; F01N 2510/06; F01N 2510/0684; Y02A 50/20; Y02T 10/12

See application file for complete search history.

(56) References Cited

U.S. PATENT DOCUMENTS

| | | | |
|---|---|---|---|
| 2004/0038812 A1 | 2/2004 | Hachisuka | |
| 2004/0043898 A1 | 3/2004 | Noda et al. | |
| 2009/0241524 A1 | 10/2009 | Takeshima et al. | |
| 2015/0158016 A1 | 6/2015 | Mori et al. | |
| 2016/0032806 A1* | 2/2016 | Sugiyama | F01N 3/2026 422/174 |
| 2016/0288099 A1 | 10/2016 | Goto et al. | |
| 2020/0080453 A1* | 3/2020 | Sakuma | F01N 3/103 |
| 2023/0032414 A1* | 2/2023 | Takasaki | B01J 35/33 |

FOREIGN PATENT DOCUMENTS

| | | |
|---|---|---|
| CN | 105764608 A | 7/2016 |
| CN | 108883406 A | 11/2018 |
| EP | 3034164 A1 | 6/2016 |
| JP | 2002361089 A | 12/2002 |
| JP | 2006192357 A | 7/2006 |
| JP | 4839773 B2 | 12/2011 |
| JP | 2014062476 A | 4/2014 |
| JP | 2014091119 A | 5/2014 |
| JP | 6052250 B2 | 12/2016 |
| WO | 2002020154 A1 | 3/2002 |
| WO | 2015079908 A1 | 6/2015 |
| WO | 2017134585 A1 | 8/2017 |

OTHER PUBLICATIONS

International Preliminary Report on Patentability in PCT/JP2020/044773, mailed Jul. 7, 2022 (7 pages).
Extended European Search Report in EP 20904813.1, mailed Feb. 9, 2023 (9 pages).
First Office Action issued in Chinese Application No. 202080090176.4 dated Mar. 5, 2024.
First Office Action issued in Japanese Application No. 2019-236718 dated Jan. 5, 2024.
International Search Report, Feb. 9, 2021, 3 Pages.
Chinese Office Action in CN 202080090176.4, dated Oct. 14, 2024 (4 pages).
Office Action, European Application No. 20904813.1, mailed Aug. 20, 2025 (4 pages).

* cited by examiner

EXHAUST PURIFICATION CATALYST

CROSS REFERENCE TO RELATED APPLICATIONS

This application is a U.S. national stage application of International Application no. PCT/JP2020/044773, filed Dec. 2, 2020, which claims the benefit of the filing date of Japanese Application No. 2019-236718, filed Dec. 26, 2019, the contents of which are hereby incorporated by reference in their entirety.

TECHNICAL FIELD

The present invention relates to exhaust gas purification catalysts, and more particularly to exhaust gas purification catalysts that are suitably usable as electrically heated catalysts.

BACKGROUND ART

An electrically heated catalyst (EHC) has been attracting attention as a catalyst that purifies exhaust gas emitted from an automobile engine or the like in recent years. To allow an exhaust gas purification catalyst for internal combustion engines to sufficiently exhibit the purification performance, a temperature of the exhaust gas purification catalyst must be raised up to a temperature at which the catalyst is activated. A usual exhaust gas purification catalyst is heated by using the heat of exhaust gas, and therefore cannot exhibit high purification performance when the temperature of the exhaust gas is low, for example, immediately after engine start. Meanwhile, for the electrically heated catalyst, the catalyst temperature can be raised in a short time by electric heating to activate the catalyst, even when the temperature of the exhaust gas is low, for example, immediately after engine start. Therefore, even when the temperature of the exhaust gas is low, the purification performance can be sufficiently exhibited, so that the exhaust gas purification efficiency can be enhanced.

A typical configuration of the electrically heated catalyst includes a base material and a catalyst layer, in which the base material contains SiC serving as a resistance heating element, and the catalyst layer contains a platinum group metal (PGM) as a catalyst component (see Patent Literature 1, for example).

CITATION LIST

Patent Literature

Patent Literature 1: Japanese Patent Publication No. 6052250B2

SUMMARY OF INVENTION

Technical Problem

The inventors of the present application have made intensive studies and have found a problem of the above-described conventional technology that the platinum group metal in the catalyst layer migrates to the base material during high temperature duration. A large amount of platinum group metal migration to the base material causes a decrease in exhaust gas purification performance. Further, for the exhaust gas purification catalyst configured as an electrically heated catalyst, a large amount of platinum group metal migration to the base material adversely affects the state of energization. This deteriorates the high temperature durability of the exhaust gas purification performance.

Solution to Problem

Therefore, an object of the present invention is to provide an exhaust gas purification catalyst in which platinum group metal migration from a catalyst layer to a base material during high temperature duration is suppressed.

An exhaust gas purification catalyst disclosed herein includes a base material, a catalyst layer, and an intermediate layer arranged between the base material and the catalyst layer. The base material contains SiC. The catalyst layer contains a platinum group metal as a catalyst component. The intermediate layer contains substantially no platinum group metal. The product of the thickness (μm) of the intermediate layer and the specific surface area ($m^2/g$) of the intermediate layer is 1100 or more.

According to this configuration, the intermediate layer has an appropriate thickness and an appropriate specific surface area, thereby exhibiting a high function as a physical barrier that obstructs platinum group metal migration. That is, the intermediate layer serves as an effective barrier layer and can suppress platinum group metal migration from the catalyst layer to the base material during high temperature duration. Therefore, the exhaust gas purification catalyst disclosed herein is excellent in high temperature durability.

In a preferred embodiment of the exhaust gas purification catalyst disclosed herein, the thickness of the intermediate layer is 30 μm or more.

This configuration further enhances the function of the intermediate layer as the barrier layer. Therefore, the intermediate layer can more suppress platinum group metal migration from the catalyst layer to the base material during high temperature duration, thus further enhancing the high temperature durability of the exhaust gas purification catalyst.

In another preferred embodiment of the exhaust gas purification catalyst disclosed herein, the specific surface area of the intermediate layer is 40 $m^2/g$ or more.

This configuration further enhances the function of the intermediate layer as the barrier layer. Therefore, the intermediate layer can more suppress platinum group metal migration from the catalyst layer to the base material during high temperature duration, thus further enhancing the high temperature durability of the exhaust gas purification catalyst.

In still another preferred embodiment of the exhaust gas purification catalyst disclosed herein, the platinum group metal contained in the catalyst layer is Pd.

Among platinum group metals, Pd can particularly easily migrate from the catalyst layer to the base material during high temperature duration. Therefore, the effect of enhancing the high temperature durability by the intermediate layer becomes particularly high in this case.

In further another preferred embodiment of the exhaust gas purification catalyst disclosed herein, the exhaust gas purification catalyst further includes an electrode, and the exhaust gas purification catalyst is an electrically heated catalyst.

This configuration provides an electrically heated catalyst highly durable at high temperatures.

DESCRIPTION OF EMBODIMENTS

Figure 1:
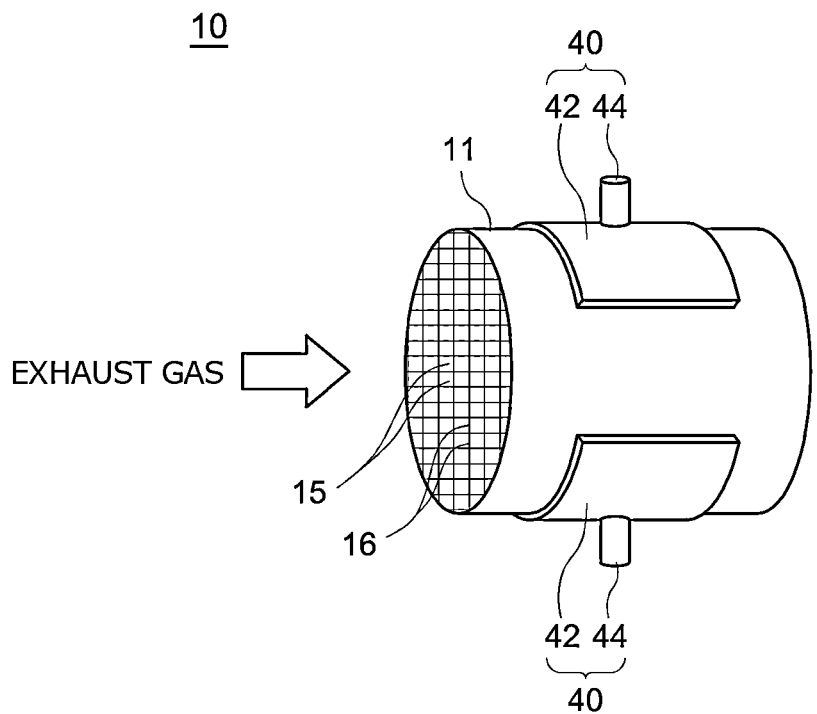
FIG. 1 is a schematic perspective view of an example of an exhaust gas purification catalyst according to an embodiment.
Figure 2:
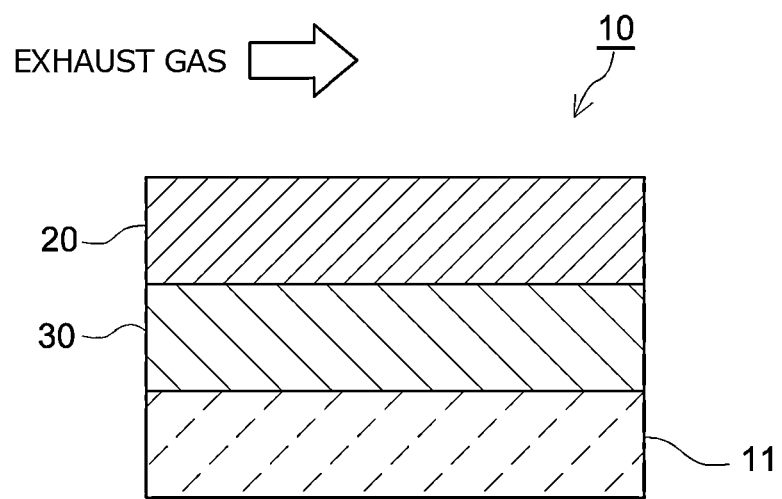
FIG. 2 is a schematic cross-sectional view of a layer structure of the exhaust gas purification catalyst illustrated in FIG. 1.

Preferred embodiments of the present invention will be described below with reference to the drawings as appropriate. Matters other than those particularly mentioned herein and necessary to carry out the present invention are recognizable as matters to be designed by a person skilled in the art on the basis of technologies known in this field. The present invention may be carried out on the basis of the description disclosed herein and technical knowledge in this field. FIGS. 1 and 2 referred to in the following description are merely schematic diagrams for understanding of the present invention. Dimensional relationships (e.g., lengths, widths, and thicknesses) in FIGS. 1 and 2 do not reflect actual dimensional relationships.

FIG. 1 schematically illustrates an example of an exhaust gas purification catalyst according to the present embodiment. FIG. 1 illustrates an example in which the exhaust gas purification catalyst according to the present embodiment is configured as an electrically heated catalyst. FIG. 2 schematically illustrates a layer structure of the exhaust gas purification catalyst of FIG. 1.

As illustrated in FIGS. 1 and 2, an exhaust gas purification catalyst 10 includes a base material 11, a catalyst layer 20, and an intermediate layer 30 arranged between the base material 11 and the catalyst layer 20.

Base Material

The base material 11 is a member supporting the catalyst layer 20 via the intermediate layer 30.

The base material 11 contains SiC (silicon carbide). Since the base material 11 contains SiC, crack generation in the base material is less likely to be caused by a thermal cycle.

Further, since SiC can serve as a resistance heating element, the base material 11 containing SiC enables the exhaust gas purification catalyst to be used as an electrically heated catalyst. The base material 11 may contain a component other than SiC, as long as the component does not significantly impair the advantageous effect of the present invention.

The shape of the base material 11 may be the same as that of a known exhaust gas purification catalyst. For example, the base material 11 may be a straight-flow or wall-flow honeycomb base material that is usually used in exhaust gas purification catalysts.

The base material 11 has a cylindrical outer shape in the example of FIG. 1. The outer shape of the base material 11 is not limited thereto and may be the shape of an elliptic cylinder or a polygonal cylinder.

The arrows in FIGS. 1 and 2 show the direction in which exhaust gas flows. The base material 11 has a plurality of cells 15 that are open at both an exhaust gas inflow side end and an exhaust gas outflow side end and a partition 16 that partitions the adjacent cells 15. The shape of each cell 15 is not specifically limited and may be a rectangular shape such as a square, a parallelogram, an oblong, or a trapezoid; another polygonal shape such as a triangle, a hexagon, or an octagon; or a circular shape. The exhaust gas purification catalyst 10 including the base material 11 in the illustrated example allows exhaust gas entering into the cells 15 through the exhaust gas inflow side end to pass through the cells 15 and exit through the exhaust gas outflow side end.

The catalyst layer 20 and the intermediate layer 30 are formed on at least a portion of the base material 11. The catalyst layer 20 and the intermediate layer 30 are formed in the cells 15, although not illustrated in FIG. 1.

Catalyst Layer

The catalyst layer 20 contains a platinum group metal as a catalyst component. That is, the catalyst layer 20 contains at least one metal selected from a group of platinum (Pt), rhodium (Rh), palladium (Pd), ruthenium (Ru), osmium (Os), and iridium (Ir). Pd and Pt are excellent in performance of purifying carbon monoxide (CO) and hydrocarbon (HC) (i.e., oxidative purification performance), and Rh is excellent in performance of purifying NOx (i.e., reduction purification performance). Therefore, the platinum group metal contained in the catalyst layer 20 is preferably at least one selected from a group of Pt, Rh, and Pd from the viewpoint of high purification performance. Among platinum group metals, Pd can particularly easily migrate from the catalyst layer 20 to the base material 11 during high temperature duration. Therefore, Pd is the most preferable as the platinum group metal contained in the catalyst layer 20 because the effect of enhancing the high temperature durability by the intermediate layer 30 becomes particularly high.

From the viewpoint of increasing the area of contact with exhaust gas, the platinum group metal is preferably in the form of fine particles. Specifically, the average particle size of the platinum group metal is preferably 15 nm or less, more preferably 10 nm or less, further preferably 7 nm or less, and the most preferably 5 nm or less. On the other hand, the average particle size of the platinum group metal is preferably 1 nm or more.

The average particle size of the platinum group metal can be determined as the mean value of the particle diameters of 20 or more particles arbitrarily selected in an electron microscope image (e.g., a TEM image) of the platinum group metal.

Further, the catalyst layer 20 usually contains a support that supports the platinum group metal. The form in which the support supports the platinum group metal is not specifically limited. The type of the support is not specifically limited, as long as the support can support the platinum group metal. The support used herein may be the type used as a support of a catalyst layer in a known exhaust gas purification catalyst. Examples of the support include: inorganic materials with oxygen storage capacity (OSC) (so-called OSC materials), such as cerium oxide (ceria $CeO_2$) and a composite oxide containing ceria (e.g., a ceria-zirconia composite oxide (a CZ or ZC composite oxide)); and oxides such as alumina ($Al_2O_3$), titania ($TiO_2$), zirconia ($ZrO_2$), and silica ($SiO_2$). These materials may be used alone or in combination of two or more. Since OSC materials can function as catalytic promoters for exhaust gas purification, the support preferably contains an OSC material, and more preferably contains a ceria-zirconia composite oxide.

The catalyst layer 20 may further contain a component other than the catalyst component and the support (e.g., a binder and/or an additive). Examples of the binder include an alumina sol and a silica sol. Examples of the additive include a NOx adsorber and a stabilizer.

The content of platinum group metal in the catalyst layer 20 is not specifically limited. For example, the content of platinum group metal is between 0.01 mass percent and 8 mass percent (inclusive), or between 0.1 mass percent and 5 mass percent (inclusive), with respect to the total mass of the support contained in the catalyst layer.

The catalyst layer 20 may have a single layer structure or a multi-layer structure of two or more layers each containing a platinum group metal. In the catalyst layer 20 having a multi-layer structure, the platinum group metals contained in respective layers may be the same or different. For example, the catalyst layer 20 may have a multi-layer structure in which a Rh-containing layer is formed on a Pd-containing layer. Further, the catalyst layer 20 may contain different platinum group catalysts in a front portion and a rear portion.

The thickness and length of the catalyst layer 20 may be determined in an appropriate manner in accordance with the size of the cells 15 in the base material 11 and the flow rate of exhaust gas to be supplied to the exhaust gas purification catalyst 10, for example. The thickness of the catalyst layer 20 is not specifically limited. For example, this thickness is between 1 µm and 500 µm (inclusive), or between 5 µm and 200 µm (inclusive).

Intermediate Layer

The intermediate layer 30 contains substantially no platinum group metal. The wording "contains substantially no" used herein means that a platinum group metal is not positively contained for the purpose of being used as a catalyst component, but mixing of the platinum group metal in manufacturing of the intermediate layer and mixing of the platinum group metal caused by impurities, for example, are allowed. Alternatively, the wording "contains substantially no" used herein means that the content of platinum group metal in the intermediate layer 30 (i.e., a platinum group metal content relative to the total weight of the intermediate layer 30) is less than 0.001 mass percent. The platinum group metal content in the intermediate layer 30 is preferably less than 0.0005 mass percent and more preferably 0 percent (that is, the intermediate layer 30 contains no platinum group metal).

The component of the intermediate layer 30 is not specifically limited, as long as the intermediate layer contains substantially no platinum group metal. The intermediate layer contains, for example, a support usable in the catalyst layer 20 (i.e., the OSC material or oxide described above). This support may contain an alkaline earth metal, such as Ba or Sr. For example, the intermediate layer 30 contains the support that is the same type as the support contained in the catalyst layer 20. The intermediate layer 30 may be the same in composition as the catalyst layer except that the intermediate layer 30 contains substantially no platinum group metal. In other words, the intermediate layer 30 contains substantially no platinum group metal, but may contain the support, the additive, and the like actually contained in the catalyst layer 20 in the same composition ratio as the catalyst layer 20.

The product of the thickness (µm) of the intermediate layer 30 and the specific surface area ($m^2/g$) of the intermediate layer 30 (i.e., the value of the thickness (µm) of the intermediate layer 30×the specific surface area ($m^2/g$) of the intermediate layer 30) is 1100 or more. In this case, the intermediate layer 30 exhibits a high function as a physical barrier that obstructs platinum group metal migration. That is, the intermediate layer 30 serves as an effective barrier layer and can suppress platinum group metal migration from the catalyst layer 20 to the base material 11 during high temperature duration. Therefore, the exhaust gas purification catalyst 10 is excellent in high temperature durability.

The product of the thickness (µm) of the intermediate layer 30 and the specific surface area ($m^2/g$) of the intermediate layer 30 is preferably large. Specifically, this product is preferably 1200 or more, more preferably 1500 or more, further preferably 2000 or more, and the most preferably 2500 or more. The upper limit of this product is not specifically limited. For example, this product is 50000 or less.

The thickness of the intermediate layer 30 is preferably 20 µm or more because this thickness further enhances the function of the intermediate layer 30 as a barrier layer. In this case, the intermediate layer 30 can more suppress platinum group metal migration from the catalyst layer 20 to the base material 11 during high temperature duration, thus further enhancing the high temperature durability of the exhaust gas purification catalyst 10. The thickness of the intermediate layer 30 is more preferably 30 µm or more and further preferably 50 µm or more. However, the excessively thick intermediate layer 30 increases resistance. From this reason, the thickness of the intermediate layer 30 is preferably 200 µm or less, more preferably 100 µm or less, and further preferably 80 µm or less.

The thickness of the intermediate layer 30 can be measured by a known method. For example, this thickness can be obtained by acquiring an electron microscope image of a cross-section of the exhaust gas purification catalyst 10 and measuring the thickness of the intermediate layer 30. When it is difficult to identify the intermediate layer 30 by using an electron microscope, an EPMA observation image of a cross-section of the exhaust gas purification catalyst 10 is acquired by using an electron probe micro analyzer (EPMA), and the intermediate layer is identified by elemental analysis. The thickness of the intermediate layer can be obtained from the EPMA observation image.

The specific surface area of the intermediate layer 30 is preferably 40 $m^2/g$ or more because this specific surface area further enhances the function of the intermediate layer 30 as a barrier layer. In this case, the intermediate layer 30 can more suppress platinum group metal migration from the catalyst layer 20 to the base material 11 during high temperature duration, thus further enhancing the high temperature durability of the exhaust gas purification catalyst 10. The specific surface area of the intermediate layer 30 is more preferably 50 $m^2/g$ or more and further preferably 70 $m^2/g$ or more. The upper limit of the specific surface area of the intermediate layer 30 is not specifically limited. For example, the specific surface area of the intermediate layer 30 is 1000 $m^2/g$ or less or 500 $m^2/g$ or less.

The specific surface area of the intermediate layer 30 described herein is a value measured with a single point BET method by a dynamic flow gas method using a nitrogen gas as an adsorbate.

It should be noted that the value of the product of the thicknesses (µm) of the intermediate layer 30 and the specific surface area ($m^2/g$) of the intermediate layer 30 can be controlled by adjusting the coating amount of a slurry for forming the intermediate layer and/or the particle diameter of a constituent material of the intermediate layer contained in the slurry, for example.

The intermediate layer 30 may have a single layer structure or a multi-layer structure of two or more layers each containing substantially no platinum group metal. From the viewpoint of ease of manufacturing, the intermediate layer 30 preferably has a single layer structure.

The exhaust gas purification catalyst 10 may include a constituent element other than the base material 11, the catalyst layer 20, and the intermediate layer 30.

The exhaust gas purification catalyst 10 is configured as an electrically heated catalyst in the example illustrated in FIG. 1. Therefore, the exhaust gas purification catalyst 10 further includes an electrode 40. The electrode 40 may be the same as the electrode included in known electrically heated catalysts and, for example, may be a metal electrode or a carbon electrode. The electrode 40 includes an electrode layer 42 provided on the outer surface of the base material 11 and an electrode terminal 44 in the illustrated example. The electrode layer 42 has a function of diffusing current. However, the configuration of the electrode 40 is not limited thereto, as long as current can be supplied to the base material 11.

The exhaust gas purification catalyst 10 can be manufactured in the following manner, for example.

First, the base material 11 is prepared. A slurry containing the component (e.g., an OSC material or an oxide) of the intermediate layer 30 is prepared. This slurry is applied and dried in the cells 15 of the base material 11 and, if necessary, fired. The intermediate layer 30 is thus formed. Next, the catalyst layer 20 is formed by a known method. Specifically, for example, a source of a platinum group metal (e.g., a solution containing platinum group metal ions), a support of the platinum group metal (e.g., an OSC material or an oxide), and a dispersion medium are mixed so as to prepare a slurry for forming the catalyst layer 20. This slurry is applied and dried on the intermediate layer 30 formed in the cells 15 of the base material 11 and then fired. The catalyst layer 20 is thus formed on the intermediate layer 30.

In another example of the manufacturing method, the base material 11 is prepared, and a slurry containing the component of the intermediate layer 30 is prepared. This slurry is applied and dried in the cells 15 of the base material 11 and, if necessary, fired. A layer is thus formed on the base material 11. Thereafter, an upper portion of the formed layer is immersed in a solution containing platinum group metal ions, for example, and dried. A firing process is then performed. By this process, a lower portion of the formed layer becomes the intermediate layer 30 containing substantially no platinum group metal, and the upper portion of the formed layer becomes the catalyst layer 20 containing the platinum group metal. Accordingly, this method can form the intermediate layer 30 on the base material 11 and also form the catalyst layer 20 on the intermediate layer 30.

The above description has described an example in which the exhaust gas purification catalyst according to the present embodiment is configured as an electrically heated catalyst. However, the exhaust gas purification catalyst according to the present embodiment is not limited thereto, as long as it is used for purifying exhaust gas of an internal combustion engine. For example, the exhaust gas purification catalyst according to the present embodiment can be configured as an exhaust gas purification catalyst for diesel engines. The exhaust gas purification catalyst for diesel engines is heated in a regeneration process. In the case where the exhaust gas purification catalyst according to the present embodiment is for diesel engines, high durability at high temperatures is demonstrated during this heating, so that platinum group metal migration from the catalyst layer to the base material can be suppressed.

In the exhaust gas purification catalyst according to the present embodiment, platinum group metal migration from the catalyst layer to the base material during high temperature duration (e.g., at 900° C. or 1000° C.) is suppressed. Therefore, the exhaust gas purification catalyst according to the present embodiment is excellent in high temperature durability.

The exhaust gas purification catalyst according to the present embodiment can be used for purifying exhaust gas of an internal combustion engine in accordance with a known method. Specifically, the exhaust gas purification catalyst according to the present embodiment is arranged and used in an exhaust system (especially an exhaust pipe) of automobile engine, for example. In the case where the exhaust gas purification catalyst according to the present embodiment is an ETC as in the illustrated example, the catalyst is electrically connected to an automobile to allow electricity to be supplied thereto from an automobile battery or the like.

The present invention will be described below in more detail by way of examples. The following description, however, is not intended to limit the present invention to the examples below.

Manufacturing of Exhaust Gas Purification Catalyst

Comparative Example 1

A honeycomb base material made of silicon carbide (the volume: 547 mL, the number of cells: 600 cpsi, the partition thickness: 5 mils, the cell shape: square, and the base material length: 500 mm) was prepared as a base material.

A palladium nitrate solution, alumina powder, CZ composite oxide powder, barium sulfate, and ion-exchange water were mixed so as to prepare a Pd-containing slurry.

A rhodium nitrate solution, alumina powder, ZC composite oxide powder, and ion-exchange water were mixed so as to prepare a Rh-containing slurry.

The Pd-containing slurry was poured into the above-described base material, and the unnecessary slurry was blown away by a blower. The wall surface of the base material was thus coated with the slurry. Then, this coated base material was placed and dried in a drier set at 120° C. for two hours and thereafter fired at 500° C. in an electric furnace for two hours. A Pd catalyst layer was thus formed.

Next, the Rh-containing slurry was poured into the above-described base material, and the unnecessary slurry was blown away by the blower. The wall surface of the base material was thus coated with the slurry. Then, this coated base material was placed and dried in the drier set at 120° C. for two hours and thereafter fired at 500° C. in the electric furnace for two hours. A Rh catalyst layer was thus formed.

The coating amounts of the Pd-containing slurry and the Rh-containing slurry were both set to 80 g/L with respect to the base material.

By these processes, the exhaust gas purification catalyst of Comparative Example 1 was obtained, in which the Pd catalyst layer and the Rh catalyst layer were stacked on the base material in turn.

EXAMPLES AND OTHER COMPARATIVE EXAMPLES

A honeycomb base material made of silicon carbide (the volume: 547 mL, the number of cells: 600 cpsi, the partition thickness: 5 mils, the cell shape: square, and the base material length: 500 mm) was prepared as a base material.

A palladium nitrate solution, alumina powder, CZ composite oxide powder, barium sulfate, and ion-exchange water were mixed so as to prepare a Pd-containing slurry.

A rhodium nitrate solution, alumina powder, ZC composite oxide powder, and ion-exchange water were mixed so as to prepare a Rh-containing slurry.

Alumina powder, CZ composite oxide powder, and ion-exchange water were mixed so as to prepare a slurry for intermediate layer.

The slurry for intermediate layer was poured into the above-described base material, and the unnecessary slurry was blown away by a blower. The wall surface of the base material was thus coated with the slurry. Then, this coted base material was placed and dried in a drier set at 120° C. for two hours and thereafter fired at 500° C. in an electric furnace for two hours to form an intermediate layer.

Next, the Pd-containing slurry was poured into this base material, and the unnecessary slurry was blown away by the blower. The wall surface of the base material was thus coated with the slurry. Then, this coated base material was placed and dried in the drier set at 120° C. for two hours and thereafter fired at 500° C. in the electric furnace for two hours. A Pd catalyst layer was thus formed.

Further, the Rh-containing slurry was poured into this base material, and the unnecessary slurry was blown away by the blower. The wall surface of the base material was thus coated with the slurry. Then, this coated base material was placed and dried in the drier set at 120° C. for two hours and thereafter fired at 500° C. in the electric furnace for two hours. A Rh catalyst layer was thus formed.

The specific surface area and thickness of the intermediate layer were changed by changing the particle diameters and surface areas of alumina powder and CZ composite oxide powder used for the intermediate layer and changing the coating amount of the slurry for intermediate layer in this procedure.

Exhaust gas purification catalysts of examples and other comparative examples, each including the intermediate layer, the Pd catalyst layer, and the Rh catalyst layer stacked on the base material in turn, were obtained in this manner.

Measurement of Thickness of Intermediate Layer

The cross-section of the exhaust gas purification catalyst of each of the examples and comparative examples was observed with an electron probe micro analyzer (EPMA) and a scanning electron microscope (SEM) to measure the thickness of the intermediate layer.

Measurement of Specific Surface Area of Intermediate Layer

A sample was fabricated by cutting out the intermediate layer from the exhaust gas purification catalyst of each of the examples and comparative examples or scraping powder from the intermediate layer of the exhaust gas purification catalyst of each of the examples and comparative examples. The sample was pre-treated by gas purging using a nitrogen gas as a purging gas at a gas flow rate of 25 mL/min and a heating temperature of 250° C. for a treatment time of about 23 minutes. Then, the specific surface area of this sample was measured with a full automatic specific surface area analyzer Macsorb Model HM-1230 (commercially available from Mountech Co., Ltd.) by single point BET by dynamic flow technique using a nitrogen gas as an adsorbate. In this measurement, a mixed gas of $N_2$ (30%) and He (70%) was used, and an adsorption temperature was set to the boiling temperature of liquid nitrogen.

High Temperature Durability Test

The exhaust gas purification catalyst of each of the examples and comparative examples was attached to an exhaust system of a V8 gasoline engine placed on a table. A 50-hour durability test was performed for this exhaust gas purification catalyst at a catalyst bed temperature of 1000° C. under the condition including predetermined fuel cut.

Evaluation of Pd Mobility

A stacked portion of layers was cut out of the exhaust gas purification catalyst of each of the examples and comparative examples into a predetermined size before and after the durability test and embedded in resin. Then, the cross-section of the stacked portion was polished. After carbon was deposited on the cross-section by vapor deposition, the cross-section was analyzed with an FE-EPMA device JXA-8530F available from JEOL.

Assuming the Pd amount in the catalyst layer before the durability test to be 100, a ratio of the amount of Pd having migrated to the base material side was obtained as Pd mobility (%). Results of the measurement are given in Table 1.

TABLE 1

|  | Thickness of intermediate layer (μm) | Specific surface area of intermediate layer ($m^2/g$) | Thickness × specific surface area of intermediate layer | Pd mobility (%) |
| --- | --- | --- | --- | --- |
| Comparative Example 1 | 0 | 0 | 0 | 40 |
| Comparative Example 2 | 10 | 10 | 100 | 21 |
| Comparative Example 3 | 10 | 30 | 300 | 19 |
| Comparative Example 4 | 10 | 40 | 400 | 18 |
| Comparative Example 5 | 10 | 70 | 700 | 16 |
| Example 1 | 10 | 120 | 1200 | 11 |
| Example 2 | 10 | 200 | 2000 | 8 |
| Example 3 | 15 | 100 | 1500 | 13 |
| Example 4 | 20 | 100 | 2000 | 11 |
| Example 5 | 30 | 100 | 3000 | 8 |
| Comparative Example 6 | 50 | 10 | 500 | 20 |
| Example 6 | 50 | 30 | 1500 | 15 |
| Example 7 | 50 | 40 | 2000 | 10 |
| Example 8 | 50 | 70 | 3500 | 7 |
| Example 9 | 50 | 120 | 6000 | 6.5 |
| Example 10 | 50 | 200 | 10000 | 6 |
| Comparative Example 7 | 100 | 10 | 1000 | 17 |
| Example 11 | 100 | 30 | 3000 | 11 |

TABLE 1-continued

|  | Thickness of intermediate layer (μm) | Specific surface area of intermediate layer (m²/g) | Thickness × specific surface area of intermediate layer | Pd mobility (%) |
|---|---|---|---|---|
| Example 12 | 100 | 40 | 4000 | 7 |
| Example 13 | 100 | 70 | 7000 | 6.7 |
| Example 14 | 100 | 120 | 12000 | 6.2 |
| Example 15 | 100 | 200 | 20000 | 5.8 |

Figure 3:
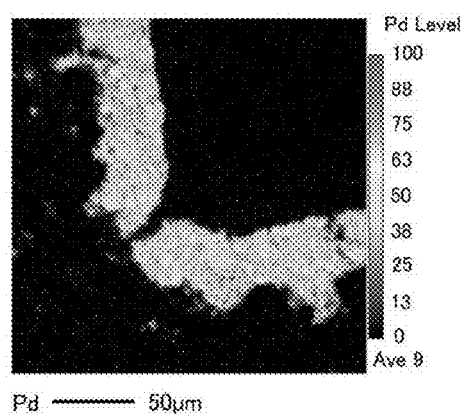
FIG. 3 shows an image of a Pd mapping result of an exhaust gas purification catalyst of Comparative Example 1 obtained by FE-EPMA before a durability test.
Figure 4:
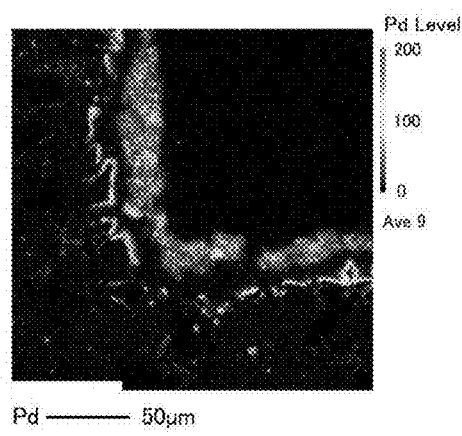
FIG. 4 shows an image of a Pd mapping result of the exhaust gas purification catalyst of Comparative Example 1 obtained by FE-EPMA after the durability test.
Figure 5:
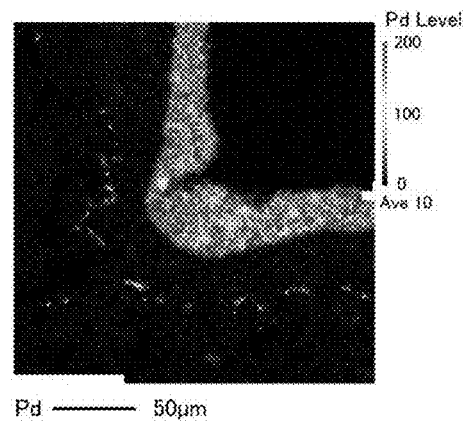
FIG. 5 shows an image of a Pd mapping result of an exhaust gas purification catalyst of Example 5 obtained by FE-EPMA after a durability test.

FIG. 3 shows a Pd mapping result of the exhaust gas purification catalyst of Comparative Example 1 obtained by FE-EPMA before the durability test. FIG. 4 shows a Pd mapping result of the exhaust gas purification catalyst of Comparative Example 1 obtained by FE-EPMA after the durability test. FIG. 5 shows a Pd mapping result of the exhaust gas purification catalyst of Example 5 obtained by FE-EPMA after the durability test.

FIGS. 3 to 5 show the Pd mapping results in a corner of a square cell in the base material, in which a portion where Pd exists appears blight. The catalyst layer is formed in an L-shape in a corner of the square cell in the base material. A bright L-shaped region was observed in FIG. 3. This shows that Pd existed in the L-shaped catalyst layer before the durability test. In FIG. 4, bright regions appeared on the left of and below the bright L-shaped region. This shows that, in Comparative Example 1 including no intermediate layer, a considerable amount of Pd has migrated from the catalyst layer to the base material side after the durability test. Also in FIG. 5, bright regions appeared on the left of and below the bright L-shaped region. However, the area of the new blight regions is much smaller than that in FIG. 4. This result shows that forming the intermediate layer was able to significantly suppress Pd migration from the catalyst layer to the base material side.

Figure 6:
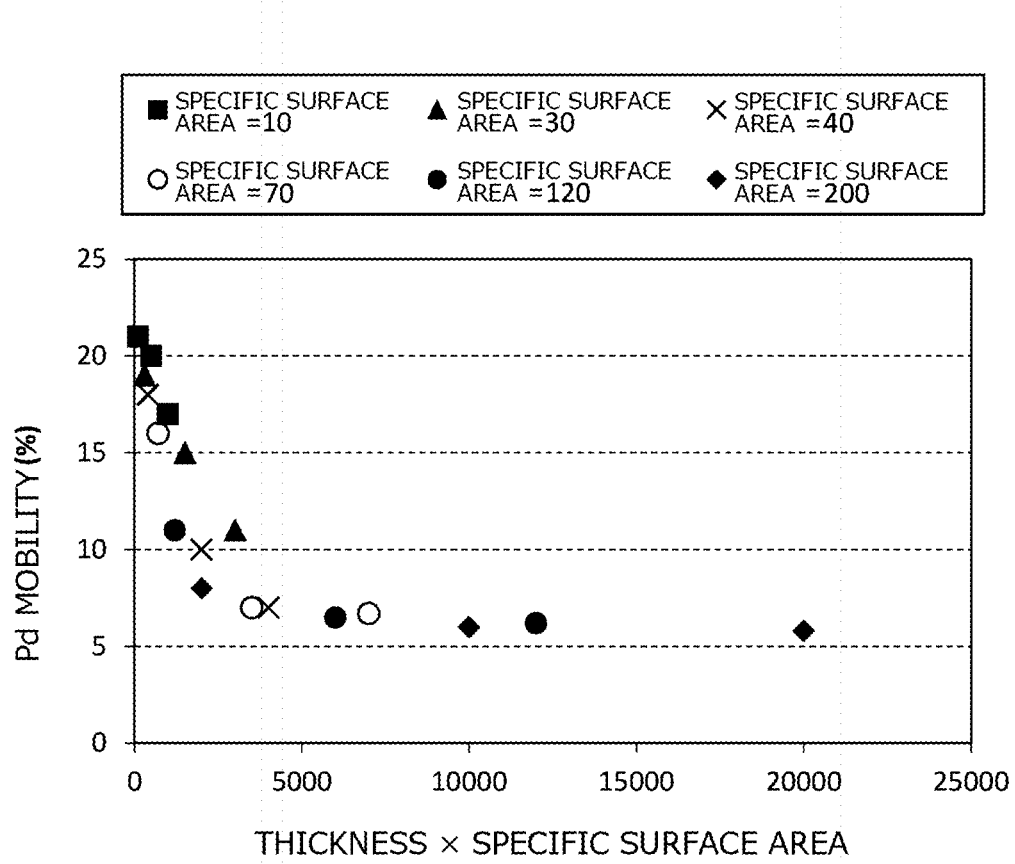
FIG. 6 shows a graph showing a relationship between the product of the thickness of the intermediate layer and the specific surface area of the intermediate layer and Pd mobility obtained from results of examples and comparative examples.

FIG. 6 shows a graph obtained by plotting Pd mobility with respect to the product of the thickness and the specific surface area of the intermediate layer on the basis of the results given in Table 1. The results of Comparative Example 1 and Examples 3 to 5 are not plotted in FIG. 6.

FIG. 6 shows that the Pd mobility becomes smaller as the product of the thickness and the specific surface area of the intermediate layer becomes larger. Considering the existence of experimental error, Pd migration was largely reduced when the product of the thickness and the specific surface area of the intermediate layer was 1100 or more. Accordingly, the above results show that the exhaust gas purification catalyst disclosed herein can suppress platinum group metal migration from the catalyst layer to the base material during high temperature duration.

The results in FIG. 6 show that this product is preferably 1200 or more, more preferably 1500 or more, further preferably 2000 or more, and the most preferably 2500 or more.

FIG. 6 also shows that the larger thickness of the intermediate layer makes the Pd mobility smaller. The results in FIG. 6 show that the thickness of the intermediate layer is preferably 20 μm or more, more preferably 30 μm or more, and further preferably 50 μm or more.

FIG. 6 also shows that the larger specific surface area of the intermediate layer makes the Pd mobility smaller. The results in FIG. 6 show that the specific surface area of the intermediate layer is preferably 40 m²/g or more, more preferably 50 μm²/g or more, and further preferably 70 m²/g or more.

Although specific examples of the present invention have been described in detail above, these are merely examples and do not limit the scope of the claims. The technology described in the claims includes various modifications and changes of the specific examples described above.

The invention claimed is:

1. An exhaust gas purification catalyst comprising:
   a base material;
   a catalyst layer; and
   an intermediate layer arranged between the base material and the catalyst layer, wherein
   the base material contains SiC,
   the catalyst layer contains a platinum group metal as a catalyst component,
   the platinum group metal contained in the catalyst layer is Pd,
   the intermediate layer contains substantially no platinum group metal, and
   a product of a thickness (μm) of the intermediate layer and a specific surface area (m²/g) of the intermediate layer is 1100 or more, further comprising an electrode, wherein
   the exhaust gas purification catalyst is an electrically heated catalyst.

2. The exhaust gas purification catalyst according to claim 1, wherein the thickness of the intermediate layer is 20 μm or more.

3. The exhaust gas purification catalyst according to claim 1, wherein the specific surface area of the intermediate layer is 40 m²/g or more.

* * * * *